(12) United States Patent
Kulkarni et al.

(10) Patent No.: US 8,242,045 B2
(45) Date of Patent: Aug. 14, 2012

(54) CERAMIC WASH-COAT FOR CATALYST SUPPORT

(75) Inventors: Anand A. Kulkarni, Orlando, FL (US); Ramesh Subramanian, Oviedo, FL (US); Stephen M. Sabol, Venetia, PA (US)

(73) Assignee: Siemens Energy, Inc., Orlando, FL (US)

( * ) Notice: Subject to any disclaimer, the term of this patent is extended or adjusted under 35 U.S.C. 154(b) by 1601 days.

(21) Appl. No.: 11/330,555

(22) Filed: Jan. 12, 2006

(65) Prior Publication Data

US 2007/0161507 A1 Jul. 12, 2007

(51) Int. Cl.
*B01J 23/10* (2006.01)

(52) U.S. Cl. ........................................ 502/303

(58) Field of Classification Search .................. None
See application file for complete search history.

(56) References Cited

U.S. PATENT DOCUMENTS

| | | | |
|---|---|---|---|
| 3,271,326 A | 9/1966 | Forney et al. | |
| 3,883,444 A * | 5/1975 | Maselli et al. | 502/258 |
| 3,938,326 A | 2/1976 | DeCorso et al. | |
| 3,943,705 A | 3/1976 | DeCorso et al. | |
| 4,067,190 A | 1/1978 | Hamm et al. | |
| 4,072,007 A | 2/1978 | Sanday | |
| 4,112,675 A | 9/1978 | Pillsbury et al. | |
| 4,306,089 A * | 12/1981 | Webster et al. | 568/472 |
| 4,451,517 A | 5/1984 | Inoguchi et al. | |
| 4,870,824 A | 10/1989 | Young et al. | |
| 5,195,165 A * | 3/1993 | Ono et al. | 392/407 |
| 5,413,984 A * | 5/1995 | Marecot et al. | 502/333 |
| 5,593,647 A * | 1/1997 | Kirby | 422/180 |
| 5,946,917 A | 9/1999 | Hums et al. | |
| 5,950,434 A | 9/1999 | Hums et al. | |
| 6,415,608 B1 | 7/2002 | Newburry | |
| 6,444,177 B1 | 9/2002 | Muller et al. | |
| 6,619,043 B2 | 9/2003 | Bruck et al. | |
| 6,620,391 B2 | 9/2003 | Muller et al. | |
| 6,662,564 B2 | 12/2003 | Bruck et al. | |
| 6,775,989 B2 | 8/2004 | Bandaru et al. | |
| 2001/0014648 A1 | 8/2001 | Hums et al. | |
| 2002/0139122 A1 | 10/2002 | Alvin et al. | |
| 2003/0103875 A1 | 6/2003 | Campbell et al. | |
| 2003/0176280 A1 * | 9/2003 | Caze et al. | 502/439 |
| 2004/0005270 A1 | 1/2004 | Xu et al. | |
| 2004/0138060 A1 | 7/2004 | Rapier et al. | |
| 2004/0180000 A1 | 9/2004 | Hagemeyer et al. | |
| 2004/0198595 A1 * | 10/2004 | Chen | 502/328 |

(Continued)

FOREIGN PATENT DOCUMENTS

WO WO2005/039757 * 5/2005

*Primary Examiner* — Emily Le
*Assistant Examiner* — Sarah A Slifka

(57) ABSTRACT

A wash-coat (16) for use as a support for an active catalyst species (18) and a catalytic combustor component (10) incorporating such wash-coat. The wash-coat is a solid solution of alumina or alumina-based material ($Al_2O_3$-0-3 wt % $La_2O_3$) and a further oxide exhibiting a coefficient of thermal expansion that is lower than that exhibited by alumina. The further oxide may be silicon dioxide (2-30 wt % $SiO_2$), zirconia silicate (2-30 wt % $ZrSiO_4$), neodymium oxide (0-4 wt %), titania ($Al_2O_3$-3-40% $TiO_2$) or alumina-based magnesium aluminate spinel ($Al_2O_3$-25 wt % MgO) in various embodiments. The active catalyst species may be palladium and a second metal in a concentration of 10-50% of the concentration of the palladium.

12 Claims, 1 Drawing Sheet

U.S. PATENT DOCUMENTS

| | | |
|---|---|---|
| 2005/0011194 A1 | 1/2005 | Laster et al. |
| 2005/0020442 A1 | 1/2005 | Sermon et al. |
| 2005/0026017 A1 | 2/2005 | Seabaugh et al. |
| 2005/0049143 A1 | 3/2005 | Eguchi et al. |
| 2005/0070431 A1 | 3/2005 | Alvin et al. |

\* cited by examiner

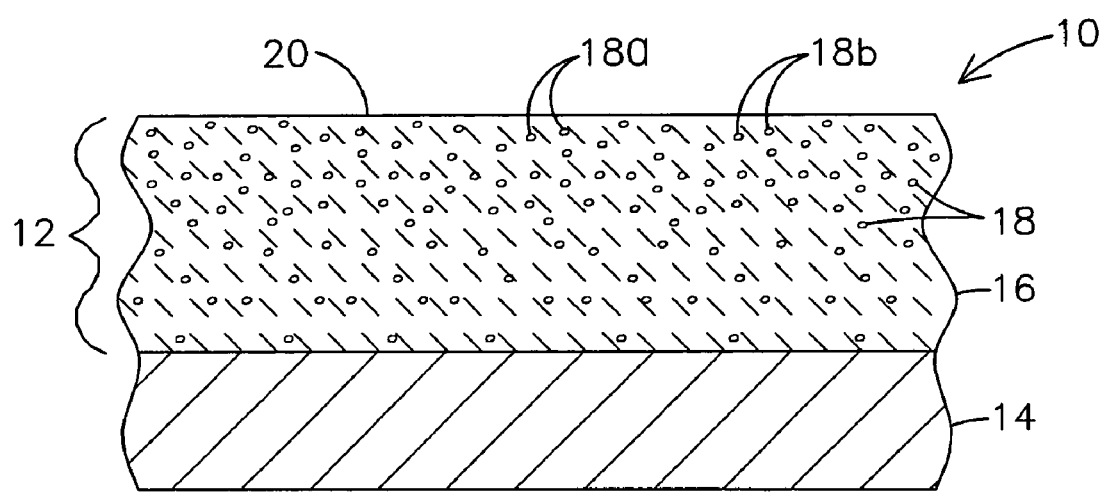

CERAMIC WASH-COAT FOR CATALYST SUPPORT

GOVERNMENT INTEREST

This invention was made with United States Government support through Contract Number DE-FC28-03NT41891 awarded by the Department of Energy, and, in accordance with the terms set forth in that contract, the United States Government may have certain rights in the invention.

FIELD OF THE INVENTION

This invention relates generally to the field of ceramics and more particularly to ceramic catalyst supports for use in combustors of gas turbine engines.

BACKGROUND OF THE INVENTION

Catalytic combustion presents a viable alternative to conventional flame combustion for addressing environmental issues for power generators such as gas turbine engines. A catalytic combustion system typically includes an active coating, such as a noble metal in a thermally stable ceramic matrix, deposited onto a metallic support. U.S. Pat. No. 4,870,824 describes a catalytic combustor wherein a first surface of a metallic conduit is coated with an active catalytic material such as palladium on a stabilized alumina ($\gamma$—$Al_2O_3$) wash-coat for causing combustion in a fuel/air plenum, while an opposed surface of the conduit has no such catalytic material and functions as a heat-removal surface to cool the conduit material.

The role of the alumina wash-coat is to provide a high surface area for exposure of the combustible mixture to the noble metal constituent. The catalyst initiates the combustion reaction at its surface at a temperature that is lower than a normal flame ignition temperature. However, once the reaction is initiated, it continues in the gas stream and persists beyond the catalyst in the form of afterburning. Simultaneously, the catalyst substrate temperature increases, resulting in an accelerated reaction that moves the reaction zone further upstream in the gas stream. The reaction must be controlled to avoid over-temperature damage to the catalyst material or to the substrate material.

The behavior of the catalyst system is primarily controlled by the properties of the active noble metal at lower temperatures. For example, the light-off temperature will be a function of the concentration of the noble metal. However, at very high temperatures, the behavior of the system will be controlled primarily by the properties of the wash-coat/support. For example, the surface area, reactivity, porosity, thermal conductivity and mechanical integrity of the wash-coat at elevated temperatures must be considered. The performance of the wash-coat may be a limiting factor in the design of a modem high temperature catalytic combustor.

BRIEF DESCRIPTION OF THE DRAWINGS

The sole FIGURE is a partial cross-sectional view of a catalytic combustor showing a metallic support structure coated with an improved combustion catalyst system.

DETAILED DESCRIPTION OF THE INVENTION

The present inventors have evaluated prior art combustion catalyst systems and have found that the known $\gamma$-$Al_2O_3$ wash-coat is adequate for certain applications, for example the backside-cooled combustor of U.S. Pat. No. 4,870,824. However, such a known alumina wash-coat exhibits several characteristics that may limit its effectiveness in very high temperature applications, such as may be desired for the next generation of catalytic combustors. In particular, the current alumina wash-coat system suffers from poor phase stability, surface area loss at high temperature, and rapid surface diffusion causing catalyst agglomeration and may be unacceptable for applications where the material temperature may exceed 800° C. The $\gamma$-$Al_2O_3$ phase with a specific surface area (SSA) of 125-250 $m^2/g$ transforms into either $\theta$ or $\delta$ phase with an SSA of 18-30 $m^2/g$ at 450° C., which then transforms to $\alpha$ phase with an SSA of 5 $m^2/g$ between 900-1100° C. depending upon the originating phase (either $\theta$ or $\delta$ phase). Surface diffusion occurs concurrently above 800° C.

The present inventors have discovered that improved catalyst system performance may be achieved by the addition of a second or more oxides, such as an oxide exhibiting a lower coefficient of thermal expansion than that of alumina, to the stabilized alumina wash-coat. Literature reports addition of $La_2O_3$ and BaO to stabilize the surface area of alumina and the addition of $CeO_2$ and NiO to prevent the transformation of PdO to Pd. In various embodiments of the present invention, silicon dioxide ($SiO_2$), zirconia silicate ($ZrSiO_4$), neodymium oxide ($Nd_2O_3$), and/or titanium dioxide ($TiO_2$) are added to the traditional alumina wash-coat as well as to the $La_2O_3$ modified $Al_2O_3$ wash-coat system. These modified alumina-based wash-coats may be referred to as doped alumina(s). As a result of a lowered thermal expansion, improved phase stability (both wash-coat and PdO) to higher temperatures and improved chemical properties, these novel multi-oxide systems retain their surface area at elevated temperatures, provide excellent thermal shock resistance, and exhibit reduced agglomeration of the active species and a reduced tendency for support structure cracking, thus preserving adhesion to the substrate and improved catalyst deactivation resistance. The net effect is a more durable catalyst with higher conversion efficiency than the prior art alumina wash-coat system.

Alternatively, magnesium aluminate ($MgAl_2O_4$) spinel can be used as wash-coat. The spinel system is sintering resistant, highly active, exhibits high melting temperature, excellent chemical stability, low acidity and good mechanical strength. The spinel phase is stable (no phase transformation) to the melting point. Furthermore, the spinel phase is an alumina-based system that is compatible with a thermally grown oxide support substrate interface leading to reduced mismatch stresses. This new wash-coat material may be referred to as a stable wash-coat.

The sole FIGURE illustrates a component 10 of a gas turbine engine combustor incorporating the present combustion catalyst system 12, wherein an underlying metallic support structure 14 is coated with a layer of an improved ceramic catalyst support 16 within which is distributed an active catalyst species 18. The catalyst species 18 may be a noble metal or other catalytic material known in the art. The catalyst species 18 may be uniformly distributed throughout the catalyst support 16 or there may be a concentration gradient across a depth of the catalyst support layer 16, such as from a higher concentration of the catalyst species 18 proximate an outermost surface 20 that is exposed to the fuel/air mixture to a lower concentration proximate the underlying support structure 14. Such non-uniform loading of the catalyst species 18 may be useful for lowering the cost of the catalyst system 12 while still providing adequate combustion performance for a specified design lifetime. The loading of the catalyst species 18 whether uniform or graduated may be in the range of 2-25 mg/in$^2$, for example.

Furthermore, the catalyst species 18 may include more than one catalytic material, such as including both palladium 18a and a second metal 18b, such as at least one of the group of platinum, rhodium, ruthenium, gold, nickel and rhenium. Palladium is often selected as a catalyst for the combustion of methane due to its low light-off temperature, resistance to thermal and hydrothermal sintering and volatilization, and durability due to its capability for self-control with reversible PdO—Pd transformation. The addition of a second or more metals may address issues related to sintering and poisoning of the palladium catalyst. The mechanisms for better stability of the bi-metallic catalyst may be attributed to influence on the Pd—PdO transformation and activity (increased stability of PdO phase) and catalyst particle size growth (for platinum and rhodium), retention of dispersion of the palladium crystallites (for ruthenium), or improved resistance to sulfur, phosphorus and nitrogen poisoning (for rhenium), for example. The concentration of the second active catalyst can range from 10-50% of the palladium concentration, depending on the operational requirements.

In one embodiment, the ceramic catalyst support 16 may incorporate silicon dioxide in addition to alumina or alumina-$La_2O_3$. The silicon dioxide may be in the range of 2-30% by weight of the alumina and can be represented as a) $Al_2O_3$-2-30 wt % $SiO_2$ or b) $Al_2O_3$-0-3 wt % $La_2O_3$-2-30 wt % $SiO_2$ (i.e. ratio of $Al_2O_3$ weight of 100:to $La_2O_3$ weight of 0-3:to $SiO_2$ weight of 2-30). The addition of $SiO_2$ results in relatively smaller loss of catalyst mass together with a lack of cracking ($SiO_2$ being a sintering aid for $Al_2O_3$) that results in better adhesion. Also the addition results in stabilization of the surface area of alumina.

In another embodiment, the ceramic catalyst support 16 may incorporate zirconia silicate in addition to alumina or alumina-$La_2O_3$. The zirconia silicate may be in the range of 2-30% by weight of the alumina and can be represented as a) $Al_2O_3$-2-30 wt % $ZrSiO_4$ or b) $Al_2O_3$-0-3 wt % $La_2O_3$-2-30 wt % $ZrSiO_4$. The addition of $ZrSiO_4$ results in increased catalytic activity due to the stabilization of the reactive PdO phase from transforming to metallic Pd. It also substantially raises the thermal shock resistance and reduces active catalyst particle agglomeration.

In a further embodiment, the ceramic catalyst support 16 may incorporate $Nd_2O_3$ in addition to alumina or alumina-$La_2O_3$. The neodymium oxide may be in the range of 0-4% by weight of the alumina and can be represented as a) $Al_2O_3$-0-4 wt % $Nd_2O_3$ or b) $Al_2O_3$-0-3 wt % $La_2O_3$-0-4 wt % $Nd_2O_3$. The addition of $Nd_2O_3$ retards active catalyst particle growth and increases lifetime. This is not due to stabilization of the surface area of alumina, but rather due to the prevention of the decrease in number of active sites as well as the prevention of the transformation of PdO to Pd in the reaction. During combustion of a fuel in the presence of the catalyst, this provides an increased NO conversion to $N^2$ and promotes the formation of CO and $H^2$ and prevents the formation of HCN, $NH_3$ and carbon formation at high temperatures. In this case, there is a synergistic effect due to $La_2O_3$ and $Nd_2O_3$ that is more prominent than for the addition of $Nd_2O_3$ only.

In a further embodiment, the ceramic catalyst support 16 may incorporate $TiO_2$ in addition to alumina or alumina-$La_2O_3$, owing to its excellent high temperature properties. The titania may be in the range of 3-40% by weight of the alumina and can be represented as a) $Al_2O_3$-3-40 wt % $TiO_2$ or b) $Al_2O_3$-0-3 wt % $La_2O_3$-3-40 wt % $TiO_2$. The titania doping aids in stabilizing gamma alumina, which is the phase of interest from the catalytic activity and surface reactivity aspect. The alumina-titania system also exhibits superior properties in terms of operating temperatures, chemical stability and low thermal expansion when compared to the prior art alumina wash-coat.

In a further embodiment, the ceramic catalyst support 16 may incorporate an alumina-based magnesium aluminate spinel. The magnesium aluminate spinel is a stoichiometric concentration ($Al_2O_3$-25 wt % MgO).

The improved ceramic catalyst support 16 may be deposited onto the metallic support structure 14 by known processes such as sol gel or thermal spray. The ceramic materials may be co-sprayed with one or more ceramicious binders and the active catalyst species 18 in a solution or powder form. Alternatively, the active catalyst species 18 may be introduced to a deposited ceramic catalyst support 16 layer by incipient wetting of the precious metal. When using doped or stable wash-coat compositions, the defined compositions is initially formed and the deposited on the substrate.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A wash-coat for use as a support for an active catalyst species, the wash-coat comprising one of alumina and an alumina-based material, plus $La_2O_3$, the $La_2O_3$ comprising no more than 0.3 wt %, and a further oxide other than $La_2O_3$, BaO, $CeO_2$ and NiO, the further oxide exhibiting a coefficient of thermal expansion that is lower than that exhibited by alumina, wherein the further oxide comprises zirconia silicate.

2. The wash-coat of claim 1 comprising 2-30 wt % $ZrSiO_4$.

3. A wash-coat for use as support for an active catalyst species, the wash-coat comprising one of alumina and an alumina-based material, plus $La_2O_3$, the $La_2O_3$ comprising no more than 0.3 wt %, and a further oxide other than $La_2O_3$, BaO, $CeO_2$ and NiO, the further oxide exhibiting a coefficient of thermal expansion that is lower than that exhibited by alumina, wherein the further oxide comprises neodymium oxide.

4. The wash-coat of claim 3 comprising no more than 4 wt % $Nd_2O_3$.

5. A wash-coat for use as a support for an active catalyst species, the wash-coat comprising one of alumina and an alumina-based material, plus $La_2O_3$, the $La_2O_3$ comprising no more than 0.3 wt %, and a further oxide other than $La_2O_3$, BaO, $CeO_2$ and NiO, the further oxide exhibiting a coefficient of thermal expansion that is lower than that exhibited by alumina, wherein the further oxide comprises titanium oxide.

6. The wash-coat of claim 5 comprising $Al_2O_3$-3-40 wt % $TiO_2$.

7. A wash-coat for use as a support for an active catalyst species, the wash-coat comprising one of alumina and an alumina-based material, plus $La_2O_3$, the $La_2O_3$ comprising no more than 0.3 wt %, and a further oxide other than $La_2O_3$, BaO, $CeO_2$ and NiO, the further oxide exhibiting a coefficient of thermal expansion that is lower than that exhibited by alumina, further comprising alumina-based magnesium aluminate spinel in a stoichiometric concentration of $Al_2O_3$-25 wt % MgO.

8. A component for a catalytic combustor comprising:
a metallic substrate;
a ceramic catalyst support disposed on the metallic substrate; and
an active catalytic species disbursed within the ceramic catalyst support;
wherein the ceramic catalyst support comprises one of alumina and an alumina-based material plus 0-3 wt % $La_2O_3$, and a further oxide other than $La_2O_3$, $BaO$, $CeO_2$ and $NiO$, the further oxide exhibiting a coefficient of thermal expansion that is lower than that exhibited by alumina;
wherein a concentration of the active catalytic species varies across a depth of the ceramic catalyst support;
wherein the further oxide comprises zirconia silicate.

9. The component of claim 8, wherein the active catalyst species further comprises palladium at a first concentration and a second metal at a second concentration of 10-50% of the first concentration.

10. The component of claim 8, wherein the active catalyst species further comprises palladium and at least one of the group of platinum, rhodium, ruthenium, gold, nickel and rhenium.

11. The component of claim 8, wherein the ceramic catalyst support comprises alumina-based magnesium aluminate spinel in a stoichiometric concentration of $Al_2O_3$-25 wt % MgO.

12. The component of claim 11, wherein the active catalyst species further comprises palladium at a first concentration and a second metal at a second concentration of 10-50% of the first concentration.

* * * * *